United States Patent [19]

Pino et al.

[11] Patent Number: 4,870,156

[45] Date of Patent: Sep. 26, 1989

[54] REMOVAL OF CATALYST RESIDUES FROM OLEFIN/CARBON MONOXIDE POLYMER WITH DITHIOCARBAMATE

[75] Inventors: Piero Pino; Luigi Venanzi; Heinz Wittwer; Ulrich Daum, all of Zurich, Switzerland

[73] Assignee: Shell Oil Company, Houston, Tex.

[21] Appl. No.: 249,935

[22] Filed: Sep. 27, 1988

[51] Int. Cl.$^4$ .............................................. C08G 67/02
[52] U.S. Cl. .................................... 528/487; 528/392; 528/481; 528/493; 528/494; 528/495; 528/496
[58] Field of Search ............... 528/487, 493, 494, 496, 528/481, 392

[56] References Cited

U.S. PATENT DOCUMENTS 4,786,716 11/1988 Van Broekhoven ............... 528/487

Primary Examiner—Harold D. Anderson
Attorney, Agent, or Firm—Dean F. Vance

[57] ABSTRACT

Catalyst residues are reduced in linear alternating polymers of carbon monoxide and at least one ethylenically unsaturated hydrocarbon produced in the presence of a Group VIII transition metal catalyst by contacting the linear alternating polymer with a dithiocarbamate compound in a non-gaseous reaction environment in an oxygenated organic reaction diluent.

8 Claims, No Drawings

REMOVAL OF CATALYST RESIDUES FROM OLEFIN/CARBON MONOXIDE POLYMER WITH DITHIOCARBAMATE

FIELD OF THE INVENTION

This invention relates to a process for the production of linear alternating polymers of carbon monoxide and at least one ethylenically unsaturated hydrocarbon, which polymers are obtained in enhanced purity. More particularly, it relates to removal of catalyst residues from polymers of carbon monoxide and at least one ethylenically unsaturated hydrocarbons produced by employing Group VIII transition metal catalysts.

BACKGROUND OF THE INVENTION

The class of polymers o: carbon monoxide and olefin(s) has been known a number of years. Early processes for the production of such polymers were typically free radical processes as illustrated by Brubaker, U.S. Pat. No. 2,495,286. The polymeric products of such processes were typically relatively low in carbon monoxide content.

More recently, processes for the production of polymers of carbon monoxide and ethylenically unsaturated hydrocarbon have been developed wherein the polymer product is a linear alternating polymer of carbon monoxide and ethylenically unsaturated hydrocarbon. Such processes typically employ a Group VIII transition metal compound or complex as catalyst. Nozaki discloses the use of a HPd(CN)3 catalyst in U.S. Pat. No. 3,835,123, a tetrakis(triarylphosphine) palladium catalyst in U.S. Pat. No. 3,698,460, and the use of an arylphosphine complex of palladium moieties employed in conjunction with inert solvents in U.S. Pat. No. 3,694,412. Shryne et al., U.S. Pat. No. 3,984,388 use nickel cyanide or tetracyanonickelate salts as catalyst. U.K. 1,081,304 teaches alkylphosphine complexes of palladium, and Sen, Chemtech. January 1986, pp. 48-51 describes the use of palladium or rhodium catalysts.

A recently developed process which is becoming of greater interest is described in published European Patent Application Nos. 121,965 and 181,014. These processes employ a catalyst composition formed from a Group VIII metal salt wherein the metal is palladium, cobalt or nickel, the anion of certain strong acids and a bidentate ligand of phosphorus, arsenic or antimony.

Linear alternating polymers of carbon monoxide and at least one ethylenically unsaturated hydrocarbon which are produced in the presence of a transition metal catalyst will typically contain some residues of the catalyst in the polymer product. If such residues are present in too great a concentration, the properties of the polymer may be adversely effected. Polymer with too great a residue of transition metal will often be discolored and may be unduly vulnerable to degradation initiated by heat or light. It would be of advantage to provide a process of reducing the level of catalyst residues in such linear alternating polymers.

SUMMARY OF THE INVENTION

This invention contemplates the production of linear alternating polymers of carbon monoxide and at least one ethylenically unsaturated hydrocarbon, which polymers are of enhanced purity because of a reduced content of catalyst residues. More particularly the present invention provides a process for treating the linear alternating polymers containing transition metal catalyst residues with a dithiocarbamate compound and thereby obtaining linear alternating polymer of enhanced purity by virtue of a reduced catalyst residue content.

DESCRIPTION OF THE INVENTION

The process of the invention serves to reduce the content of transition metal catalyst residues in a linear alternating copolymer of carbon monoxide and at least one ethylenically unsaturated hydrocarbon. Such linear alternating polymers are often referred to as polyketones or polyketone polymers. They are represented by the repeating formula —CO—(A)— wherein A is a moiety of ethylenically unsaturated hydrocarbon polymerized through the ethylenic unsaturation. By way of further illustration, when the unsaturated hydrocarbon is ethylene, the polymer is represented by the repeating formula —CO—(—CH$_2$—CH$_2$—)—.

Suitable ethylenically unsaturated hydrocarbons for use as precursors o the polyketones have up to 20 carbon atoms inclusive, preferably up to 10 carbon atoms inclusive, and are aliphatic such as ethylene and other alpha-olefins including propylene, 1-butene, isobutylene, 1-hexene and 1-dodecene, or are arylaliphatic containing an aryl substituent on a carbon atom of an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or terpolymers of carbon monoxide, ethylene and a second ethylenically unsaturated hydrocarbon of at least 3 carbon atoms, particularly an alpha-olefin such as propylene.

When terpolymers of carbon monoxide, ethylene and a second ethylenically unsaturated hydrocarbon are produced, there will be at least two units incorporating a moiety of ethylene for each unit incorporating a moiety of the second hydrocarbon, preferably from about 10 to about 100 units incorporating a moiety of ethylene for each unit incorporating a moiety of the second hydrocarbon. The polymer chain is therefore represented by the following repeating formula

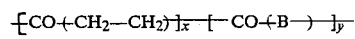

wherein B is the moiety by polymerization of the second hydrocarbon through the ethylenic unsaturation. The —CO—(—CH$_2$—CH$_2$—)— units and the —CO—(—B—)— units are formed randomly throughout the polymer chain and the ratio of y:x is no more than about 0.5. In the modification where copolymers of carbon monoxide and ethylene are produced, there will be no second hydrocarbon present in the polymer chain and the polymers are represented by the above formula wherein y=0. When y is other than 0, i.e., terpolymers are produced, the ratio of y:x is preferably from about 0.10 to about 0.1. The end groups or "caps" of the polymer chain will depend on what materials are present during the production of polymer and whether and how the polymer is processed prior to the application of the process of the invention. The precise nature of the end groups is of little significance so far as the overall properties of the polymer are concerned so that the polymer is fairly represented by the repeating formula depicted above.

Of particular interest are the polyketone polymers of molecular weight from about 1,000 to about 200,000, particularly those of molecular weight from about 10,000 to about 50,000. The physical properties of the polymers will depend in part on whether the polymer is a copolymer or a terpolymer as well as the proportion of second hydrocarbon present in the case of terpolymers, and upon the molecular weight of the polymer. Typical melting points of the polymers are from about 175° C. to about 280° C., more frequently from about 200° C. to about 270° C.

The polyketone polymers which are purified according to the process of the invention are the linear alternating polymers produced by contacting the carbon monoxide and ethylenically unsaturated hydrocarbon in the presence of a catalyst composition containing a transition metal catalyst. Suitable Group VIII transition metal-containing catalysts are known in the art and generally involve a complex of the Group VIII transition metal with an electron rich anion or ligand. Preferred Group VIII transition metal catalysts contain a metal selected from palladium, cobalt, nickel or rhodium complexed with cyanide ions or ligands containing phosphorus, arsenic or antimony. A preferred catalyst system is that disclosed in copending U.S. Pat. No. patent application Ser. No. 930,468, filed Nov. 14, 1986. This process of producing polyketone polymer is extensive but preferably employs a catalyst composition formed from a palladium carboxylate, especially palladium acetate, the anion of a non-hydrohalogenic acid having a pKa less than about 6, e.g., the anion of trifluoroacetic acid or p-toluenesulfonic acid, and a bidentate ligand of phosphorus, arsenic or antimony, particularly 1,3-bis(diphenylphosphino)propane. Also particularly suitable as catalysts for the production of the polyketone polymers are cyanide complexes of palladium, e.g., HPd(CN)$_3$, or of nickel, e.g., [N(C$_4$H$_9$)$_4$]$_2$Ni(CN)$_4$. In general, polymers produced by employing a palladium-containing catalyst are preferred.

The production of the polyketone polymers is accomplished by conventional techniques. The process is generally conducted in an inert diluent such as an alkanol, e.g., methanol or ethanol. The reactants are contacted during reaction by shaking or stirring at an elevated reaction temperature, such as about 30° C. to about 150° C., and a reaction pressure of from about 1 bar to about 200 bar. Subsequent to reaction the polymer is recovered as by filtration or decantation.

In the process of the invention, polyketone polymer of enhanced purity is obtained by treatment of the polyketone polymer produced by employing the Group VIII transition metal catalyst with a dithiocarbamate compound in a non-gaseous reaction environment in an inert oxygenated organic reaction diluent. Without wishing to be bound by any particular theory, it is considered likely that the dithiocarbamate compound complexes with the Group VIII metal catalyst residues present in the initial polymer product while the polymer is dissolved in or swollen by the oxygenated organic reaction diluent. Recovery of the polymer from the mixture with dithiocarbamate-complexed catalyst residues affords polymer of reduced catalyst residue content and thus enhanced purity.

The dithiocarbamate compound employed in the removal of catalyst residues is a N,N-di(hydrocarbyl)dithiocarbamic acid or alkali metal salt thereof. One class of such dithiocarbamate compounds is represented by the formula

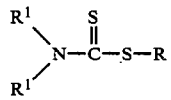

wherein R is hydrogen or alkali metal, e.g., lithium, sodium, potassium, rubidium or cesium, but preferably is sodium, and R$^1$ is independently hydrocarbyl of up to 10 carbon atoms inclusive. Illustrative R groups include aliphatic groups such as methyl, ethyl, propyl, hexyl and decyl as well as aromatic groups such as phenyl, tolyl and xylyl. In general, preferred R$^1$ groups are lower alkyl, i.e., alkyl of up to 4 carbon atoms inclusive. Suitable dithiocarbamate compounds therefore include N,N-dimethyldithiocarbamic acid, sodium N,N-diethyldithiocarbamate, N,N-dibutyldithiocarbamic acid, sodium N-methyl-N-propyldithiocarbamate and potassium N,N-diphenyldithiocarbamate. Alkali metal salts of the N,N-di(hydrocarbyl)dithiocarbamic acid are preferred over the corresponding free acids and particularly preferred is sodium N,N-diethyldithiocarbamate.

The linear alternating polymer is contacted with the dithiocarbamate compound in a non-gaseous reaction environment in an inert oxygenated organic reaction diluent. In one modification, the polymer is dissolved in the reaction diluent to produce a solution to which the dithiocarbamate compound is added. Because of relative insolubility of the polymer in most common organic solvents, when it is desired to treat a solution of the polyketone with dithiocarbamate compound, a diluent such as o-chlorophenol, m-cresol or hexafluoroisopropanol is employed. For most purposes, however, it is not necessary to completely dissolve the polymer for efficient treatment with dithiocarbamate compound and a partial swelling of the polymer in the oxygenated organic reaction diluent is sufficient. Suitable oxygenated organic reaction diluent include monohydroxylic alcohols such as methanol, ethanol and isopropanol as well as dihydroxylic alcohols such as ethylene glycol; ketones such as acetone and methyl ethyl ketone and ethers, particularly cyclic ethers such as dioxane and tetrahydrofuran. Ethanol is a particularly preferred reaction diluent.

The dithiocarbamate compound is employed in a quantity which is approximately stoichiometric and molar ratios of the dithiocarbamate compound to the metallic catalyst residue present in the polymer to be purified and molar ratios of from about 3:1 to about 1:3 are satisfactory although a preferred molar ratio is substantially 1:1.

In the process of the invention, the polyketone polymer is dissolved or suspended in the oxygenated reaction diluent and the dithiocarbamate compound is added. The complexing reaction typically takes place at an elevated temperature and temperatures from about 30° C. to about 250° C., preferably from about 50° C. to about 200° C., are satisfactory. Reflux temperature of the reaction mixture is a convenient temperature for the purification process. The reaction pressure to be employed is sufficient to maintain the mixture primarily in a non-gaseous environment and will typically be from about 1 bar to about 100 bar.

Subsequent to the purification reaction, the polymer of reduced catalyst residue content is recovered by conventional methods. In modifications where dithiocarbamate compound serves to purify polymer suspended in the oxygenated organic reaction diluent, merely cooling the reaction mixture to ambient temperature and recovering the polymer as by filtration or decantation is sufficient. In the embodiment where dithiocarbamate compound contacts a solution of polymer, the addition, subsequent to treatment with dithiocarbamate, of a non-solvent for the polymer results in precipitation of the polymer from solution and the resulting precipitate is recovered as previously described. Suitable non-solvents for this purpose are the oxygenated organic reaction diluents in which the polymer is not soluble.

The polymers of reduced catalyst residue content thereby obtained have the utility of the unpurified polymers in that they are processed by conventional methods for thermoplastics into films, sheets, and shaped articles of conventional utility. In addition, however, the polymers of reduced catalyst residue content are less likely to exhibit undesirable discoloration or degradation induced by heat or light and are particularly useful for applications where elevated temperatures are likely to be encountered.

The invention is further illustrated by the following Comparative Examples (not of the invention) and the following Illustrative Embodiments which should not be construed as limiting.

Illustrative Embodiment I

A 3 g sample of a linear alternating copolymer of carbon monoxide and ethylene (m.pt. 250° C.) obtained by using a HPd(CN)$_3$ catalyst was dissolved in 500 ml of hexafluoroisopropanol and, after centrifugation to remove any metal particles, was reprecipitated by addition to 2.5 liters of methanol. The polymer, when dried, was found by X-ray fluorescence to contain 2230 ppm of palladium. To a solution of 0.3 g of that polymer in 50 ml of hexafluoroisopropanol was added 90 g of sodium N,N-diethyldithiocarbamate trihydrate. The resulting solution was refluxed under nitrogen for 2 hours and then cooled. The polymer was precipitated by the addition of 250 ml of tetrahydrofuran. The precipitate was separated from the supernatant liquid and held in suspension for 24 hours by agitation in methanol and then in acetone and finally in carbon tetrachloride. The polymer was recovered and dried and subjected to X-ray fluorescence analysis. The palladium content of the polymer was less than 100 ppm, the lower detection limit of the analytical method for palladium.

ILLUSTRATIVE EMBODIMENT II

The procedure of Illustrative Embodiment I was employed to purify a second sample of the copolymer of Illustrative Embodiment I except that, after contact with sodium N,N-diethyldithiocarbamate, the polymer was precipitated with methanol instead of tetrahydrofuran. The palladium content of the dried polymer was 630 ppm of palladium.

ILLUSTRATIVE EMBODIMENT III

A 1 g sample of a linear alternating copolymer of carbon monoxide and ethylene was suspended in 100 ml of ethanol containing 200 mg of sodium N,N-diethyldithiocarbamate. The suspension was refluxed for 35 hours and the polymer was removed by filtration and washed with ethanol. The suspension-filtration-washing operations were repeated three times with the presence of the dithiocarbamate and once without. The carefully dried polymer was shown by X-ray fluorescence analysis to contain 197 ppm of palladium.

ILLUSTRATIVE EMBODIMENT IV

The procedure of Illustrative Embodiment III was repeated except that a single solution of 200 mg of sodium N,N-diethyldithiocarbamate was used. The palladium content of the dried polymer was 294 ppm.

ILLUSTRATIVE EMBODIMENT V

The procedure of Illustrative Embodiment I was repeated except that acetone was used as the suspension medium instead of ethanol. The palladium content of the dried polymer was 518 ppm.

ILLUSTRATIVE EMBODIMENT VI

The procedure of illustrative Embodiment I was repeated except that tetrahydrofuran was employed as the suspension medium instead of ethanol. The palladium content of the dried polymer was 363 ppm.

ILLUSTRATIVE EMBODIMENT VII

A 220 g sample of a linear alternating polymer of carbon monoxide and ethylene (m.pt. 250° C.) containing 2300 ppm of palladium was suspended in 5 liters of ethanol containing 4 g of sodium N,N-diethyldihiocarbamate. The solution was refluxed for 162 hours in an argon atmosphere in a vessel screened to prevent degradation by visible light or ultra-violet radiation. The polymer was then recovered by filtration, suspended in tetrahydrofuran and the suspension was refluxed for 62 hours.

The polymer was recovered by filtration and dried and then dissolved in 1.5 liter of o-chlorophenol. The solution was agitated for 5.5 hours at 60° C. To the polymer solution was then added 4 liters of ethanol containing 4 g of sodium N,N-diethyldithiocarbamate and the mixture was heated for 18 hours at 70° C. while being agitated. After cooling, the polymer was recovered by filtration and dried and then suspended in 5 liters of ethanol and the suspension was refluxed for 77 hours. After filtration, the polymer was suspended in tetrahydrofuran, filtered and dried. Upon X-ray fluorescence analysis, any palladium present was below the lower detection limit of the analysis which for palladium is 100 ppm.

ILLUSTRATIVE EMBODIMENT VIII

A 459 mg sample of a linear alternating copolymer of carbon monoxide and ethylene was produced using tetrabutylammonium nickel cyanurate, i.e., [N(C$_4$H$_9$)$_4$]$_2$[Ni(CN)$_4$], as catalyst. The polymer was purified as described in embodiment I. When analyzed by X-ray fluorescence for nickel, it was found that the amount of any nickel present was below the lower detection limit of the analysis which for nickel is 500 ppm.

COMPARATIVE EXAMPLE I

A 500 mg sample of the copolymer of Illustrative Embodiment I containing 3,000 ppm of palladium was suspended in 12 ml of water. To the suspension was added 100 mg of sodium N,N-diethyldithiocarbamate and the resulting mixture was heated in an autoclave for 5.75 hours. After the suspension was cooled. the polymer was recovered by filtration, washed with water and vacuum dried at ambient temperature. By X-ray fluorescence, the palladium content was found to be 1770 ppm.

COMPARATIVE EXAMPLE II

The Comparative Experiment I was repeated using 4 ml of water with the suspension being heated at 200° C. for 3 hours. The palladium content of the polymer was 1364 ppm.

ILLUSTRATIVE EMBODIMENT IX

A 300 mg sample of a linear alternating terpolymer of carbon monoxide, ethylene and propylene was produced according to Illustrative Embodiment I. The sample, containing 3,000 ppm of palladium, was suspended in 20 ml of ethylene glycol. To the suspension was added 100 mg of sodium N,N-diethyldithiocarbamate and the suspension was heated in an autoclave for 15 minutes. Any palladium present in the dried polymer was below the lower detection limit of X-ray fluorescence analysis which for palladium is 100 ppm.

What is claimed is:

1. In the process of producing a linear alternating polymer of carbon monoxide and at least one ethylenically unsaturated hydrocarbon by contacting the carbon monoxide and the hydrocarbon in the presence of a Group VIII metal-containing catalyst, wherein the metal is palladium, cobalt, nickel or rhodium, the improvement which comprises contacting the linear alternating polymer thereby produced with a dithiocarbamate compound in a non-gaseous reaction environment in the presence of an oxygenated organic reaction diluent, and recovering therefrom the linear alternating polymer of enhanced purity.

2. The process of claim 1 wherein the dithiocarbamate compound is of the formula

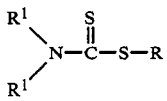

wherein R is hydrogen or alkali metal and $R^1$ independently is hydrocarbyl of up to 10 carbon atoms inclusive.

3. The process of claim 2 wherein R is sodium and $R^1$ independently is lower alkyl.

4. The process of claim 3 wherein R is ethyl.

5. In the process of producing a linear alternating polymer of carbon monoxide and at least one ethylenically unsaturated hydrocarbon by contacting the carbon monoxide and the hydrocarbon in the presence of a palladium-containing catalyst, the improvement which comprises contacting the linear alternating polymer thereby produced with a dithiocarbamate compound in a non-gaseous reaction environment in the presence of an oxygenated organic reaction diluent, and recovering therefrom the linear alternating polymer of enhanced purity.

6. The process of claim 5 wherein the dithiocarbamate compound is of the formula

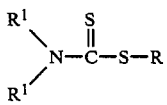

wherein R is hydrogen or alkali metal and $R^1$ independently is hydrocarbyl of up to 10 carbon atoms inclusive.

7. The process of claim 6 wherein R is sodium and $R^1$ independently is lower alkyl.

8. The process of claim 7 wherein $R^1$ is ethyl.

* * * * *